CONDUIT SAW

Original Filed May 15, 1967

INVENTOR.
ELMER R. HUTCHINSON
BY Harry C. Nieuws
ATTORNEY

United States Patent Office

Re. 26,717
Reissued Nov. 18, 1969

26,717
CONDUIT SAW

Elmer Richard Huchinson, North Hollywood, Calif., assignor of one-half to Elmer D. Dudek, Costa Mesa, Calif.

Original No. 3,371,415, dated Mar. 5, 1968, Ser. No. 638,432, May 15, 1967. Application for reissue June 17, 1968, Ser. No. 741,827
Int. Cl. B26d *1/16*
U.S. Cl. 30—90.3 7 Claims

Matter enclosed in heavy brackets [ ] appears in the original patent but forms no part of this reissue specification; matter printed in italics indicates the additions made by reissue.

ABSTRACT OF THE DISCLOSURE

There is described in the specification a manually operated saw for making longitudinal cuts into cables and conduits and the like. The device is arranged so that a longitudinal section of the conduit is held in a vice one jaw of which has a finger paddle and the other a hand heel paddle whereby the jaws may be manually clamped. A saw blade carried by a hinged saw blade holder is lowered in selected degree through a cutout or slot in one jaw of the device into the space where the conduit is clamped. A handle is arranged to turn the saw blade.

This invention relates to conduit saws and particularly to an improved manually operated conduit saw.

While not limited thereto, the invention is particularly advantageous for making longitudinal cuts in flexible metal-sheathed electrical conduits such for example as BX-type conduit. BX conduit is made by spiral wrapping a metal strip and it can be cut by severing through one coil of the spiral. A common form of electrical cable comprises one or more wires contained in a spiral metal sheath. Such a cable is readily cut to length by pinching or sawing it transversely. But stripping the sheath back to expose a length of wire is not so simple a task. There is danger of damaging the wires of the cable or of damaging the insulation on the wires.

The invention provides a saw that will perform the required task. A major application for conduit saws lies in the electrical installation phase of construction work. An object of the invention is to provide a saw which can be used on the job in any position, in minimum space, in any work condition.

A related object is to provide a conduit saw that is easy to use and to control and that will get the job done quickly and well.

Another object is to provide a rugged, dependable tool that is inexpensive to manufacture.

Another object is to provide a conduit saw that is safe for the user both because its features and construction are safe and because it can be used at arm's length, either up or down or otherwise, so the user can avoid unsafe positions and places while using it.

The saw is generally organized as follows. Means are provided for gripping and holding that area of a conduit in which the saw cut is to be made. A saw is included, and means are provided for bringing the saw into engagement with the conduit to be cut and for applying the saw blade with requisite or desired pressure against the conduit. Also, means are provided for effecting a cutting motion with the saw.

Figure 3:
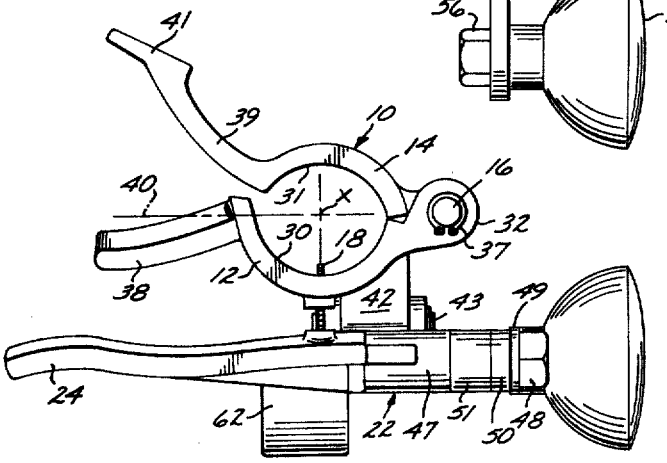
FIGURE 3 is a view in front elevation of the conduit cutter of FIGURES 1 and 2.

Referring first to FIGURE 3, the means for gripping and holding the conduit to be cut advantageously comprises, as shown, a conduit clamp generally designated by the numeral 10. The conduit clamp includes two jaws which will be referred to as a first jaw 12 and a second jaw 14. These two jaws are hingedly connected to one another along one edge of each by a hinge pin 16. At its opposite edge each jaw is provided with laterally extending paddles by which the jaws may be forced together manually.

The saw is a circular blade 18 which fits into a slot 20 formed through the first jaw 12. The means for putting the saw into engagement with a conduit which might be held in the jaws comprises in this embodiment, a saw blade holder 22 on which the saw blade is rotatably mounted. The blade holder 22 is pivoted to one end of the first jaw 12 and it extends the length of the jaw. The saw blade 18 fits down through slot 20 as the blade holder 22 is pivoted down toward the clamp 10. A paddle 24 extending laterally from the opposite end of the blade holder provides a means for forcing the blade through the slot.

The saw blade 18 is bolted to one end of a spindle and a handle 26 is bolted to the other end. Rotation of the handle rotates the blade 18.

Many modifications are possible but certain advantages of the invention are best realized by the specific constructional features of the form selected for illustration in the drawings and which are described in detail as follows.

Viewed from the front in FIGURE 3 it is apparent that the jaws 12 and 14 are formed with a depression or are grooved throughout their length whereby together they define an elongate opening, bounded by the inner surfaces 30 and 31 respectively. This elongate opening is of size to accommodate, in tightly clamped condition, a flexible metal conduit of selected size when the jaws 12 and 14 are forced almost fully together. The first jaw 12 is formed with three hinge sections at the right of the jaw when viewed in FIGURE 3 and located one 32 at the front end, a second 34 at the rear end, and the third 33 midway between the first and second. The other jaw 14 is provided with two hinge sections 35 and 36. Section 35 is disposed between the sections 32 and 33 of jaw 12 and section 36 is disposed between the sections 33 and 34 of jaw 12. A bore extending through all five of these hinge sections accommodates the hinge pin 16. The pin has an annular groove at each end. These grooves are not visible in the drawings but they contain the spring retainer clips 37 by which the pin 16 is held in place.

The jaws 12 and 14 are clamped together by manual pressure applied to the several paddles which extend laterally from the jaws at the side opposite the hinge. A hand heel paddle 38 extends from the first jaw 12 and a finger paddle 39 extends from jaw 14. Both of these paddles lie opposite and behind (see FIGURE 1) the central region at which the saw blade is disposed. The cutter unit is arranged to be held in the left hand with the fingers below (above in FIGURE 3) the finger paddle 39 and with the rear palm or heel of the hand, above the hand heel paddle.

Figure 2:
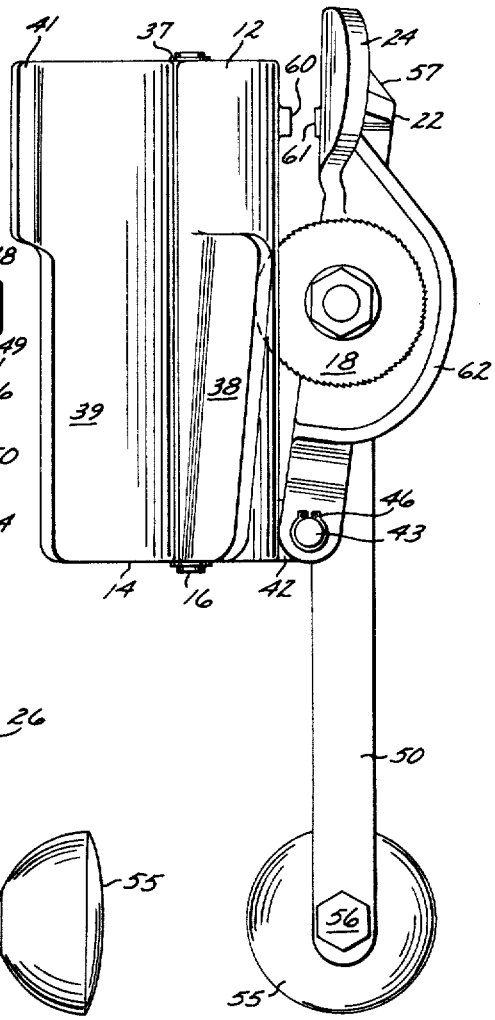
FIGURE 2 is a view in side elevation of the conduit cutter shown in FIGURE 1.

The orientation of these paddles is shown in FIGURE 3. The central axis X of the elongated clamp opening lies at the intersection of the vertical plane containing the saw blade and a plane normal to it that contains the axis of the pivot. The latter plane is identified by the numeral 40 in FIGURE 3. Neither the hand heel paddle 38 nor the finger paddle 39 are parallel to plane 40. Instead both are angled back away from that plane on that side of the plane on which its respective jaw is disposed. The finger paddle 39 lies in a plane that is substantially parallel to a plane that includes axis X. This, in the preferred embodiment shown, is not true to the hand heel paddle. As best shown in FIGURE 2, this paddle 38 is canted away from plane 40 when moving from the rear of the cutter toward the front edge of the paddle 38 just past the central region of the cutter. This orientation permits the application of pressure to the paddle especially by that portion of the heel of the hand at the base of the thumb.

At the forward portion of the finger paddle beginning opposite the forward end of the hand heel paddle, a further lateral extension 41 forms a forefinger paddle.

Figure 1:
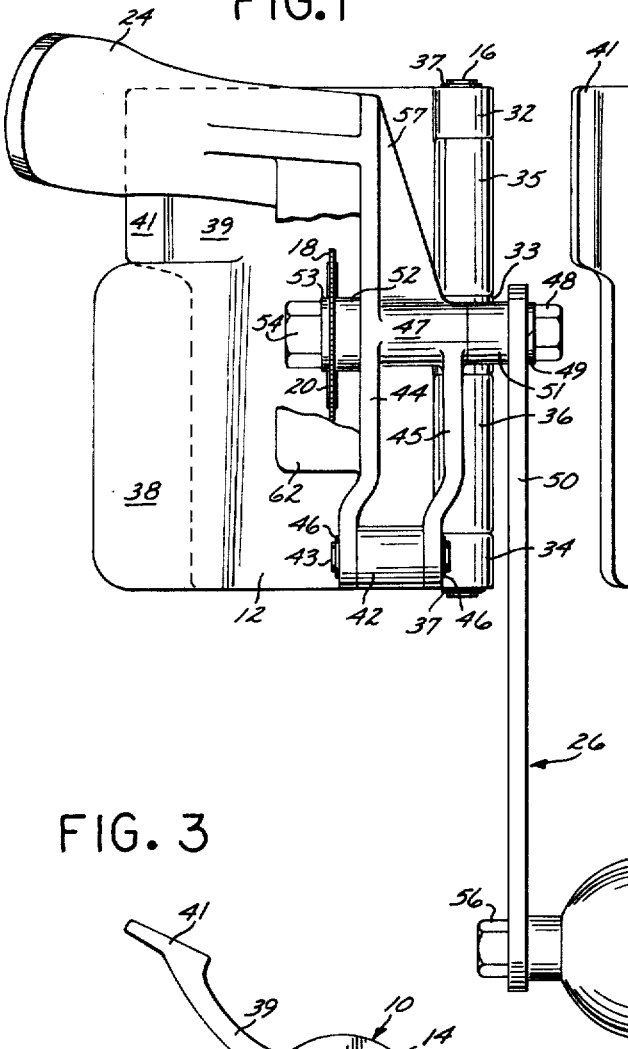
FIGURE 1 is a top plan view of a conduit cutter embodying the invention in which part of the saw shield is broken away to expose the saw blade.

As best shown in FIGURES 1 and 3, an arm 42 integrally formed with jaw 12 stands up (down in FIGURE 3) from the rear edge of the jaw. It stands up parallel with the plane of the saw blade toward the hinged side of the jaw. The saw blade holder 22 is pivoted to the arm 42 by a pin 43. The rear portion of the holder is divided into two arms 44 and 45 which straddle arm 42. The pin 43 extends through all three arms 42, 44 and 45 and is held in place by spring retaining clips 46. At their forward end the arms 44 and 45 join a laterally disposed hub section 47.

The saw blade 18 and the handle 26 are assembled on a spindle that extends through this hub. The spindle is a bolt having a hex-head 48. From right to left in FIGURE 1 the assembly comprises head 48, lockwasher 49, handle arm 50, spacer 51, hub 47, spacer 52, saw blade 18, washer 53 and finally a nut 54. The handle arm 50 is turned by a spinner knob 55 connected by a screw 56 to arm 50.

The forward bracket portion 57 of the saw blade holder serves as a bracket to hold the laterally extending thumb paddle 24. The thumb paddle is directly over the first finger paddle so that the thumb and first fingers can exert a pressure to force the saw blade into slot 20 that is different from the jaw clamping pressure applied by the other fingers and the heel of the hand. Downward travel of the saw holder 22 is limited by a pair of cooperating stops in the form of boss 60 on jaw 12 and a boss 61 on the forward bracket portion 57 of the saw blade holder.

To protect the saw blade and the user, a hood or shield 62 is formed integrally with the blade holder 22 and it extends over the blade.

In operation of the device, the jaws are pivoted in open and are placed over a flexible conduit, or other tube or rod-like material to be cut, so the conduit lies in the elongated opening formed by the jaws. The saw is positioned along the conduit until the blade overlies the place at which the saw-cut is to be made. Thereupon the jaws are clamped together by pressure forcing the finger and hand heel paddles together. Using the thumb paddle or the saw handle or both, the saw blade holder is pivoted to lower the blade 18 into slot 20. Then the blade handle 26 is rotated while the blade is forced downward by pressure between the first finger paddle and the thumb paddle. This pressure, because of the arrangement of the paddles, can be applied independently of the jaw clamping pressure and of force applied to the jaws to keep the saw oriented as desired while the saw is turned.

I claim:

1. A device for sawing electrical conduit comprising in combination:

a conduit clamp including a first jaw and a second jaw hinged one to the other along one side of each and each having a depression formed therein defining jointly an elongate opening adapted when the jaws are clamped in a direction to force them together to hold a length of conduit, said first jaw having a slot formed therethrough in a direction permitting communication with said elongate opening on a plane extending substantially through its axis;

means for forcing said jaws together comprising a hand heel paddle fixed to and extending laterally from the opposite side of said first jaw and a finger paddle fixed to and extending laterally from the opposite side of said second jaw;

a circular conduit saw blade;

means comprising a saw blade holder having hinged connection to said first jaw at a point rearwardly of said slot by which said saw blade may be inserted into said elongate opening in selected degree through said slot;

and means comprising a thumb paddle extending laterally from said saw holder toward the side of said clamp on which said finger and hand heel paddles are fixed; and means for rotating said saw blade.

2. The invention defined in claim 1 in which said saw blade is mounted on said saw blade holder at a position intermediate said thumb paddle and the point at which said holder is hinged to said first jaw.

3. The invention defined in claim 1 in which said second jaw is provided with a forefinger paddle formed as a lateral extension of that portion of said finger paddle which underlies said thumb paddle.

4. The invention defined in claim 1 in which said saw blade is mounted in a plane substantially perpendicular to a plane extending through the hinged connection of said jaws and between said hand heel and finger paddles, and in which said saw blade holder is hinged for motion in said plane and said means for rotating said saw blade comprises a handle connected thereto and disposed for rotation in a plane parallel to that of said saw blade on the side of said clamp at which said jaws are pivoted together.

*5. A device for sawing electrical conduit comprising in combination:*

*a conduit clamp including a first jaw and a second jaw hinged one to the other along one side of each and each having a depression formed therein defining jointly an elongate opening adapted when the jaws are clamped in a direction to force them together to hold a length of conduit, said first jaw having a slot formed therethrough in a direction permitting communication with said elongated opening on a plane extending substantially through its axis;*

*means for forcing said jaws together comprising a hand heel paddle fixed to and extending laterally from the opposite side of said first jaw and a finger paddle fixed to and extending laterally from the opposite side of said second jaw;*

*a circular conduit saw blade;*

*means comprising a saw blade holder having hinged connection to said first jaw at a point spaced away from said slot by which said saw blade may be inserted into said elongated opening in selected degree through said slot;*

*means comprising a thumb paddle connected to one of said saw blade holder and said first jaw, said thumb paddle being located forward of said saw blade at a position on the side of said clamp on which said finger and hand heel paddles are fixed so as to be adapted to receive a thumb of a person having the heel of his hand on said hand heel paddle and his fingers on said finger paddle;*

*and means for rotating said saw blade.*

*6. A device for sawing electrical conduit comprising in combination:*

*a first jaw and a second jaw disposed in a generally horizontal position;*

*hinge means along a right edge of said jaws swingably connecting them together;*

*said first and second jaws each having a centrally disposed recess extending parallel to said hinge means from a rear edge of each jaw to a front edge of each jaw to form an elongated opening having an axis extending generally parallel to said hinge means, said opening being adapted to receive therein a conduit to be clamped by said jaws when said jaws are clamped together;*

*one of said jaws having a slot therethrough extending along a plane extending through said axis at a midpoint of said one of said jaws;*

*a saw blade at least partially received through said slot;*

*means movably mounting said saw blade on said device*

*for rotary movement and for movement in the plane of said slot into said recess and any conduit held in said recess, said last mentioned means mounting said saw blade for rotary movement about an axis extending at a right angle to said plane at a position intermediate the front and rear edges of said jaws;*

*means for clamping said jaws together comprising:*

*a hand heel paddle fixed to said first jaw and extending from the left side of said recess, said hand heel paddle being located at a point to the rear of said axis of rotation of said saw blade;*

*a finger paddle fixed to said second jaw and extending from the left side of said recess, said finger paddle being located at a point in front of said axis of rotation of said saw blade;*

*and means for applying rotary force to said saw blade in a clockwise direction as seen from the right side of said device, whereby said hand heel paddle and finger paddle not only clamp the jaws together but the downward force on the hand heel paddle and the upward force on the finger paddle resist rotational forces applied to said saw.*

*7. The device set forth in claim 6 wherein:*

*said hand heel paddle extends forward of said axis of rotation of said saw blade.*

References Cited

The following references, cited by the Examiner, are of record in the patented file of this patent or the original patent.

UNITED STATES PATENTS

| | | | |
|---|---|---|---|
| 2,031,470 | 2/1936 | Eck et al. | 30—90.3 |
| 2,176,646 | 10/1939 | Thatcher | 30—90.3 |
| 2,396,442 | 3/1946 | Shaver et al. | 30—90.3 X |
| 2,551,401 | 5/1951 | Underhill | 30—90.3 |
| 2,654,941 | 10/1953 | Schleimer | 30—90.3 |
| 2,674,027 | 4/1954 | Kosinski | 30—90.3 |
| 2,796,657 | 6/1957 | Schlueter | 30—90.3 |
| 3,022,574 | 2/1962 | Green et al. | 30—90.3 |
| 3,108,373 | 10/1963 | Ruskin | 30—90.3 |
| 3,273,236 | 9/1966 | McDowell | 30—90.2 |

MYRON C. KRUSE, Primary Examiner